United States Patent
Ye et al.

(10) Patent No.: US 11,653,306 B2
(45) Date of Patent: May 16, 2023

(54) WAKE-UP SIGNAL SUB-GROUPING FOR ENHANCED MACHINE TYPE COMMUNICATION (EMTC) AND NARROWBAND INTERNET OF THINGS (NB-IOT)

(71) Applicant: Apple Inc., Cupertino, CA (US)

(72) Inventors: Qiaoyang Ye, San Jose, CA (US); Debdeep Chatterjee, San Jose, CA (US); Gregory Morozov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/267,140

(22) PCT Filed: Aug. 8, 2019

(86) PCT No.: PCT/US2019/045606
§ 371 (c)(1),
(2) Date: Feb. 9, 2021

(87) PCT Pub. No.: WO2020/033618
PCT Pub. Date: Feb. 13, 2020

(65) Prior Publication Data
US 2021/0314869 A1 Oct. 7, 2021

Related U.S. Application Data

(60) Provisional application No. 62/829,588, filed on Apr. 4, 2019, provisional application No. 62/739,063, filed
(Continued)

(51) Int. Cl.
*H04L 67/145* (2022.01)
*H04W 52/02* (2009.01)
(Continued)

(52) U.S. Cl.
CPC ....... *H04W 52/0235* (2013.01); *H04L 67/145* (2013.01); *H04W 4/70* (2018.02); *H04W 72/0446* (2013.01)

(58) Field of Classification Search
CPC ............. H04L 67/145; H04L 29/0861; H04W 4/005; H04W 28/0215; H04W 68/00; H04W 76/27
See application file for complete search history.

(56) References Cited

U.S. PATENT DOCUMENTS

| 2012/0275365 A1 | 11/2012 | Anderson et al. |
| 2019/0166556 A1* | 5/2019 | Ly ..................... H04W 52/0216 |

(Continued)

FOREIGN PATENT DOCUMENTS

WO 2011/116849 A1 9/2011

OTHER PUBLICATIONS

R1-1807109, "Detailed design for Wake-up signal sequence", May 21-25, pp. 1-12 (Year: 2018).*
(Continued)

*Primary Examiner* — Salvador E Rivas
(74) *Attorney, Agent, or Firm* — Eschweiler & Potashnik, LLC (57) ABSTRACT

Techniques discussed herein can facilitate communication of group-based WUS(s) (Wake Up Signal(s)) for eMTC (enhanced Machine Type Communication) and/or NB (NarrowBand)-IoT (Internet of Things). One example embodiment is an apparatus configured to be employed in a UE (User Equipment), comprising: a memory interface; and processing circuitry configured to: determine a WUS group of a plurality of WUS groups, wherein the WUS group is associated with a first group WUS (Wake Up Signal) of a plurality of group WUSs; determine a starting subframe for the first group WUS; and monitor the starting subframe for
(Continued)

the first group WUS, wherein the UE is configured to communicate via one or more of eMTC or NB (Narrow-Band)-IoT.

20 Claims, 5 Drawing Sheets

Related U.S. Application Data on Sep. 28, 2018, provisional application No. 62/717,172, filed on Aug. 10, 2018.

(51) Int. Cl.
*H04W 4/70* (2018.01)
*H04W 72/0446* (2023.01)

(56) References Cited

U.S. PATENT DOCUMENTS

| | | | | |
|---|---|---|---|---|
| 2019/0349856 A1* | 11/2019 | Liu | | H04W 72/0453 |
| 2020/0169982 A1* | 5/2020 | Höglund | | H04W 68/025 |
| 2020/0367168 A1* | 11/2020 | Hwang | | H04W 76/28 |
| 2021/0136687 A1* | 5/2021 | Liu | | H04W 68/005 |
| 2021/0227467 A1* | 7/2021 | Liu | | H04W 52/0229 |

OTHER PUBLICATIONS

"3GPP TS 36.211 v.14.2.0", Apr. 2017, pp. 1-196 (Year: 2017).*
R1-1806159, "Wake-up signal configurations and procedures" May 21-25, 2018, pp. 1-6 (Year: 2018).*
International Search Report dated Nov. 29, 2019 for International Application No. PCT/US2019/045606.
"Wake-up signal configurations and procedures for NB-Iot." Source: Ericsson. Agenda Item: 6.2.7.1.1.2. 3GPP TSG-RAN WG1 Meeting #93, Busan, Korea, May 20-24, 2018. R1-1805855.
"Wake-up signal configurations and procedures." Source: Nokia, Nokia Shanghai Bell. Agenda Item: 6.2.7.1.1.2. 3GPP TSG RAN WG1 Meeting #93, Busan, Korea, May 21-25, 2018. R1-1806159.
"Discussion on Wake up signal configuration." Source: Samsung. Agenda Item: 6.2.7.1.1.2. 3GPP TSG RAN WG1 Meeting #93. Busan, Korea, May 21-25, 2018. R1-1806687.
LTE; Evoloved Universal Terrestrial Radio Access (E-UTRA); Physical channels and modulation (3GPP TS 36.211 version 14.2.0 Release 14). ETSI TS 136 211 V14.2.0 (Apr. 2017).
"New WID on Rel-16 MTC enhancements for LTE." Source: Ericsson. Agenda Item: 10.1.3. 3GPP TSG RAN Meeting #80, La Jolla, USA, Jun. 11-14, 2018. RP-181450.
"New WID on REL-16 enhancements for NB-IoT." Source: Ericsson, Huawei. Agenda Item: 10.1.3. 3GPP TSG RAN Meeting #80, La Jolla, USA, Jun. 11-14, 2018. RP-181451.
Technical Specification; 3GPP TS 36.300 V15.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15); Jun. 2018; p. 1-357.
Technical Specification; 3GPP TS 36.304 V15.0.0; 3rd Generation Partnership Project; Technical Specification Group Radio Access Network; Evolved Universal Terrestrial Radio Access (E-UTRA); User Equipment (UE) Procedures in idle Mode; Release 15; Jun. 2018; p. 1-52.
"Sidelink"; 3GPP TS 36.211 V15.2.0; Release 15; Jun. 2018; p. 187-236.
"UE Procedures Related to Sidelink"; 3GPP TS 36.213 V13.10.0; Release 13; p. 344-381.
International Preliminary Report on Patentability dated Feb. 16, 2021 for International Application No. PCT/US2019/045606.

* cited by examiner

WAKE-UP SIGNAL SUB-GROUPING FOR ENHANCED MACHINE TYPE COMMUNICATION (EMTC) AND NARROWBAND INTERNET OF THINGS (NB-IOT)

REFERENCE TO RELATED APPLICATIONS

This application is a National Phase entry application of International Patent Application No. PCT/US2016/045606 filed Aug. 8, 2019, which claims priority to U.S. Provisional Patent Applications No. 62/717,172 filed Aug. 10, 2018, entitled "WAKE-UP SIGNAL SUB-GROUPING FOR REL-16 EMTC AND NB-IOT", No. 62/739,063 filed Sep. 28, 2018, entitled "WAKE-UP SIGNAL SUB-GROUPING FOR REL-16 EMTC AND NB-IOT", and No. 62/829,588 filed Apr. 4, 2019, entitled "WAKE-UP SIGNAL SUB-GROUPING FOR REL-16 EMTC AND NB-IOT", and is hereby incorporated by reference in its entirety.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Embodiments described herein can be implemented into a system using any suitably configured hardware and/or software. In various aspects, embodiments discussed herein can facilitate the communication of WUS(s) (Wake Up Signal(s)) based on UE sub-groups for eMTC and/or NB-IoT.

Figure 1:
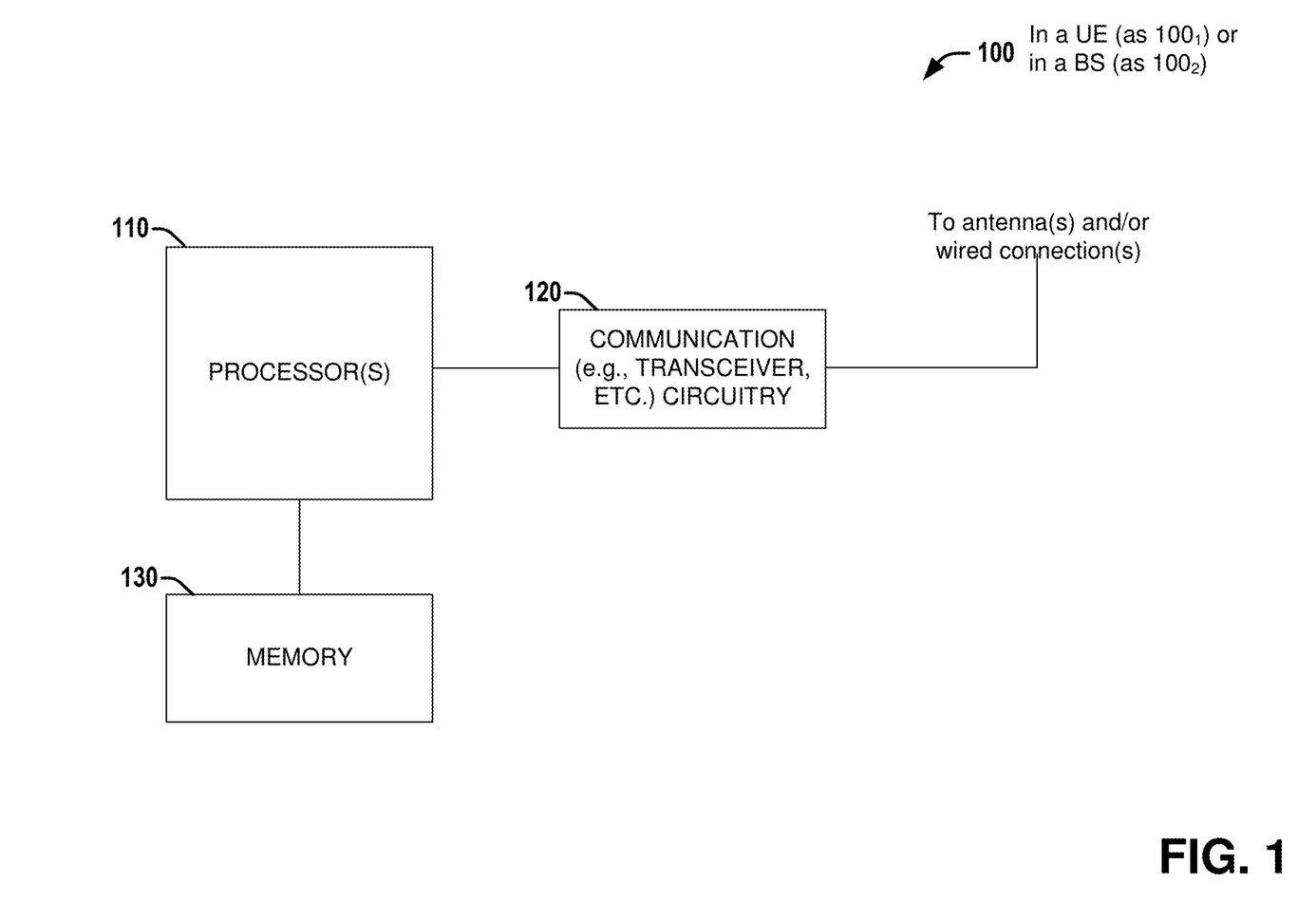
FIG. 1 is a block diagram illustrating a system employable at a UE (User Equipment) or BS that facilitates communication of WUS(s) (Wake Up Signal(s)) based on UE sub-groups, according to various aspects described herein.

Referring to FIG. 1, illustrated is a block diagram of a system 100 employable at a UE (User Equipment) (e.g., as system $100_1$) or a BS (Base Station) (e.g., as system $100_2$) that facilitates communication of WUS(s) (Wake Up Signal(s)) based on UE sub-groups, in embodiments. System 100 can include processor(s) 110 comprising processing circuitry and associated interface(s) (e.g., a communication interface for communicating with communication circuitry 120, a memory interface for communicating with memory 130, etc.), communication circuitry 120 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 130 (which can comprise any of a variety of storage mediums and can store instructions and/or data associated with one or more of processor(s) 110 or transceiver circuitry 120). In various aspects, system 100 can be included within a user equipment (UE). In BS aspects, system $100_2$ can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network, wherein processor(s) $110_2$, communication circuitry $120_2$, and memory $130_2$ can be in a single device or can be included in different devices, such as part of a distributed architecture. In embodiments, signaling from a UE to a BS can be generated by processor(s) $110_1$, transmitted by communication circuitry $120_1$, received by communication circuitry $120_2$, and processed by processor(s) $110_2$, while signaling from a BS to a UE can be generated by processor(s) $110_2$, transmitted by communication circuitry $120_2$, received by communication circuitry $120_1$, and processed by processor(s) $110_1$.

In a 3GPP (Third Generation Partnership Project) Rel-16 (Release 16) eMTC (enhanced MTC (Machine Type Communication)) WI (Work Item), one targeted enhancement for further development is to support a UE (User Equipment)-group wake-up signal (WUS) to improve UE power saving: "Improved DL transmission efficiency and/or UE power consumption:Specify support for UE-group wake-up signal (WUS) [RAN1 (Radio Access Network WG1 (Working Group 1)), RAN2, RAN4]."

Similarly, a Rel-16 NB (NarrowBand)-IoT (Internet of Things) WI also has a targeted enhancement for further development to specify support of UE-group WUS: "Improved DL transmission efficiency and/or UE power consumption: Specify support for UE-group wake-up signal (WUS) [RAN1, RAN2, RAN4]."

In various embodiments, WUS communication can be sent and received according to a design discussed herein that can support UE-group WUS for both Rel-16 eMTC and NB-IoT. The following discussion begins with a brief overview of the design of WUS in Rel-15 eMTC and NB-IoT. WUS or DTX (Discontinuous Transmission) was introduced in Rel-15 eMTC and NB-IoT for idle mode, where WUS can be transmitted when there is at least one UE in the associated paging group to be woken up.

For frequency domain resource configuration, in NB-IoT, the WUS is a 1-PRB signal. On the other hand, in eMTC, WUS is a 2-PRB signal with NB-IoT WUS repeated in the frequency domain over 2 continuous PRBs.

For time domain resource configuration, the WUS occupies the last 11 symbols in a subframe, and can be repeated to achieve certain coverage. The number of repetitions can be configured via a scaling factor between a maximum WUS duration and Rmax of MPDCCH (MTC-PDCCH (Physical Downlink Control Channel)) candidate for paging. A non-zero gap from the end of a configured maximum WUS duration to the associated PO (Paging Occasion) is configurable by higher layer.

WUS sequence design can employ a length-131 ZC (Zadoff_Chu) sequence and Gold sequence for RE (Resource Element)-level scrambling as follows: "The WUS sequence w(m) in subframe x=0, 1, . . . , M−1 is defined by $$w(m) = \theta_{n_f,n_s}(m') \cdot e^{\frac{j\pi un(n+1)}{131}}$$

$$m = 0, 1, \ldots, 131$$

$$m' = m + 132x$$

$$n = m \bmod 132$$

$$\theta_{n_f,n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 1 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

$$u = (N_{ID}^{cell} \bmod 126) + 3$$

where M is the actual duration of WUS.
The scrambling sequence $c_{n_f,n_s}(i)$, i=0, 1, . . . , 2·132M−1 is given by clause 7.2 in [3GPP TS 36.211], and [can] be initialized at the start of the WUS with $$c_{init\_WUS} = (N_{ID}^{cell} + 1)\left(\left(10 n_{f\_start\_PO} + \left\lfloor \frac{n_{s\_start\_PO}}{2} \right\rfloor\right) \bmod 2048 + 1\right)2^9 + N_{ID}^{cell}$$

where $n_{f\_start\_PO}$ is the first frame of the first PO to which the WUS is associated, and $n_{s\_start\_PO}$ is the first slot of the first PO to which the WUS is associated."

In Rel-15 eMTC and NB-IoT (e.g., which can apply to legacy UEs that do not support group-based WUSs), one WUS applies to all the UEs associated to the corresponding PO(s). In contrast, various embodiments discussed herein can support sub-grouping of WUS, whereby UE power saving can be further improved over existing (e.g., Rel-15) systems by reducing the probability of waking up a UE when the paging is for another UE associated to the same PO.

Various embodiments discussed herein can communicate WUS according to a design for WUS sub-grouping for Rel-16 eMTC and NB-IoT discussed herein. In particular, details of this design include features and techniques that can be employed for: (1) Configuration and capability for UE-group WUS; (2) Determination of the UE-groups; and (3) Multiplexing of WUS for different UE groups.

Configuration and Capability: For configuration of UE-group WUS, in various embodiments, UE-group WUS can be enabled and/or disabled by higher layer signaling. In one example, the cell-specific signaling (e.g. SIB1 (System Information Block Type 1)-BR (Bandwidth Reduced) or SIBx-BR with x>1 for eMTC, and SIB1-NB or SIBy-NB with y>1 for NB-IoT) can be used for the configuration. The supported number of UE groups can be 1, 2, 3, 4, or greater. In one example embodiment, the maximum number of UE groups that can be supported by eMTC and NB-IoT can be different, for example, up to 4 UE groups for eMTC and up to 2 UE groups in NB-IoT.

In some embodiments, the number of UE groups can be fixed in the 3GPP specification. In other embodiments, the number of UE groups can be configured by higher layer signaling (e.g., via SIB as mentioned above).

UE capability can also be addressed in a variety of ways, depending on the embodiment. In some embodiments, the UE can signal its capability regarding support of UE-group WUS via an existing capability reporting procedure. In other embodiments, the Rel-16 UEs supporting the feature of WUS can support the UE-group WUS.

Determination of UE Sub-Groups: In various embodiments, the groups can depend on a UE_ID (UE Identifier, e.g., IMSI (International Mobile Subscriber Identity)). In some such embodiments, the UE_ID can be IMSI mod 4096 for NB-IoT and IMSI mod 16384 for eMTC, similar to what is used to calculate the PO in Rel-13 NB-IoT and eMTC, respectively. In the following discussion, the number of UE groups is $N_G$.

In some example embodiments, the UE group ID for a UE can be determined (e.g., via processor(s) $110_1$ and/or processor(s) $110_2$) by UE_ID mod $N_G$.

Alternatively, in other example embodiments, the UE group ID for a UE can be floor(UE_ID/N) mod $N_G$, where N=min(T, nB), T is the DRX cycle of the UE as defined in TS 3GPP 36.304, and nB can be 4T, 2T, T, T/2, T/4, T/8, T/16, T/32, T/64, T/128, T/256, and for NB-IoT also T/612 and T/1024.

In other example embodiments, the UE group ID for a UE can be determined by floor(UE_ID/N/Ns) mod $N_G$, where N is defined as above, and Ns=max(1, nB/T).

In other example embodiments, for eMTC, the UE group ID for a UE can be floor(UE_ID/N/Ns/Nn) mod $N_G$, where N and Ns are defined as above, and Nn is the number of paging narrowbands in system information. For NB-IoT, the UE group ID for a UE can be floor(UE_ID/N/Ns/W) mod $N_G$, where N and Ns are defined as above, and W is the total weight of all NB-IoT paging carriers (i.e., W=W(0)+W(1)+ . . . +W(Nn−1)).

In other embodiments, any of the above options can be combined with the use of a hashed version of the UE_ID (UE_ID_hashed) to better distribute the UEs across the WUS sub-groups. For instance, UE_ID_hashed= (A*UE_ID) mod D, where A and D are prime numbers, e.g., those defined for EPDCCH (Enhanced PDCCH (Physical Downlink Control Channel)) as in 3GPP TS 36.213.

In other embodiments, the UE group ID for a UE can be determined by floor(UE_ID_H/$T_{eDRX,H}$) mod $N_G$, or floor (UE_ID_H/$T_{eDRX,H}$/4) mod $N_G$, where UE_ID H is 10 most significant bits of the Hashed ID for eMTC (e.g., wherein UE_ID H and its relationship to the Hashed ID can be as discussed in 3GPP TS 36.304 for MPDCCH) and 12 most significant bits of the Hashed ID for NB-IoT (e.g., wherein UE_ID H and its relationship to the Hashed ID can be as discussed in 3GPP TS 36.304 for NPDCCH), and $T_{eDRX,H}$ is the eDRX (extended DRX) cycle of the UE in Hyperframes. This can be used when UE is configured with eDRX.

In other embodiments, the groups can depend on C-RNTI (Cell-RNTI (Radio Network Temporary Identifier)) assigned for the UE before it goes to Idle mode. For example, the UE group ID can be C-RNTI mod $N_G$.

Design of WUS for Support of UE Sub-Groups: In some embodiments, a common wake-up indication for all UE groups can be defined. This can be used for SI updates and direct indication information. In such embodiments, the WUS can be designed to support $N_G+1$ cases, such that $N_G+1$ distinguishable WUS can be multiplexed before the corresponding PO are supported.

In some example embodiments, the WUS sequence and resources allocated for Rel-15 UEs (e.g., legacy UEs which do support group WUSs) can be used for common wake-up indication. In such embodiments, the power saving for Rel-16 UEs can be reduced, since the common wake-up indication will be sent as long as there is at least one Rel-15 UE to wake up in the corresponding PO.

In other example embodiments, the WUS sequences and the resources allocated for Rel-15 WUS can be used for WUS indication of one UE group for Rel-16 UEs. In such embodiments, it would be equivalent to assign a sub-group of Rel-16 UEs and all Rel-15 UEs associated to the corresponding PO to the same group.

In other example embodiments, WUS sequences and/or the set of time/frequency resources for the WUS that are different from Rel-15 WUS can be used for all the Rel-16 UE groups and the common wake-up indication for all Rel-16 UE groups. With this example, for cases of SI updates or direct indication information, both the Rel-15 WUS and the WUS for common indication of all Rel-16 UE groups can be sent to wake up all Rel-15 and Rel-16 UEs associated to the corresponding PO.

Various embodiments can employ one of the following multiplexing techniques for the WUS of different UE groups.

In some embodiments, the WUS for different UE groups or common indication can be multiplexed in frequency domain. In Rel-15 eMTC, the WUS occupies 2 PRBs in the frequency domain, while there are 6 PRBs available in each narrowband. Up to 3 WUS can be multiplexed in the frequency domain within the narrowband. A mapping from PRB 0, 2 and 4 to the lowest PRB location of WUS for UE group 0, UE group 1 and common indication can be defined.

In some embodiments, mapping can be fixed in the specification, e.g., PRB 0 for UE group 0, PRB 2 for UE group 1, PRB 4 for common WUS indication, etc.

Alternatively, in other embodiments, the mapping can be configured by higher layer signaling. In other words, which is the lowest PRB location for UE group 0, UE group 1 and common WUS indication could be indicated by higher layer signaling.

In other embodiments, a lowest PRB location for common WUS indication can be configured by higher layer (e.g., the PRBs for Rel-15 WUS), while other PRBs can be allocated in order for UE groups. For example, the PRBs with smaller indexes can be for UE group 0, while the PRBs with larger indexes can be for UE group 1.

In cases where frequency domain multiplexing and code domain multiplexing (as discussed below) are both used, UE group 0 and UE group 1 in embodiments can be replaced by UE groups i, i+1, i+X−1, and UE groups i+X, i+X+1, i+2X−1, respectively. The UE groups i, i+1, i+X−1 cam be allocated to the same set of PRBs and distinguishable by different sequences. Similarly, UE groups i+X, i+X+1, i+2X−1 can be allocated to the same set of PRBs and distinguishable by different sequences, where X is the number of WUS that can be multiplexed in the code domain.

On top of the frequency domain multiplexing within one narrowband, different narrowbands can be configured to multiplex WUS for more UE groups associated to the same PO. For example, $N_{NB}$ can be configured, which allows the support of up to $3N_{NB}$ UE groups. The narrowband associated to a UE group can be signaled by higher layer, e.g., as a part of the UE-group WUS configuration. Alternatively, the NBs across which the WUS sub-groups corresponding to a paging NB (PNB) can be distributed are the same as the set of NBs for paging monitoring, following, for example, an ascending order of indexing of each 2-PRB sets within each of the PNBs with wrap-around, such that for a sequence of PNBs $(s_j, s_{j+1}, \ldots, s_{j+n} \ldots, s_{j+Nn-1})$, the WUS-frequency-domain resources can be identified as $(0, 1, 2, \ldots, (Nn*3-1))$ such that resource indices #0, #1, #2 belong to $NB_{Sj}$, #3, #4, #5 belong to $NB_{Sj}+1$, etc. Thus, determination of the UE-sub-group automatically leads to identification of the corresponding NB and the particular 2-PRB set within the NB to monitor for WUS.

In such embodiment, frequency retuning can be employed for switching from the narrowband to monitor WUS to the narrowband for paging monitoring. In one example, the configured gap duration between the end of the maximum WUS duration to the start of associated PO can be used for the frequency retuning.

For NB-IoT, multiple NB-IoT DL carriers can be configured to multiplex WUS for different UE groups in the frequency domain. The NB-IoT DL carrier associated to the UE group can be configured by higher layer, e.g., as a part of the UE-group WUS configuration. Alternatively, the NB-IoT DL carrier associated to a UE group for WUS monitoring can be determined similar to the determination of paging carrier in the case of NB-IoT paging with multiple carriers. That is, for $N_{wus}$ NB-IoT DL carriers with WUS, the UE group (and thus the carrier for WUS monitoring) can be given as the carrier with the smallest n that satisfies floor (UE_ID/N/Ns) mod $W<W(0)+W(1)+ \ldots +W(n)$, where $W=W(0)+W(1)+\ldots+W(N_{wus}-1)$. In such embodiments, to realize additional frequency domain multiplexing beyond the paging carriers, $N_{wus}$ can be greater than Nn, where Nn is the number of NB-IoT DL carriers associated with paging.

In such embodiments, frequency retuning can facilitate switching from the DL carrier to monitor WUS to the DL carrier for paging monitoring. For example, like eMTC techniques discussed above, the configured gap duration between the end of maximum WUS duration to the start of associated PO can be used for the frequency retuning.

In other embodiments, different WUS sequences can be defined for different UE groups and/or common WUS indication.

In some example embodiments, time-domain cyclic shifts can be used. For example, similar to NSSS, 4 cyclic shifts {0, 33, 66, 99} can be used. Alternatively, 2 or 3 cyclic shifts can be used, e.g. {0, 66} or {33, 99} for 2 cyclic shifts, and {0, 44, 88} can be used for 3 cyclic shifts. With cyclic shift of 0, the sequence is the same as Rel-15 WUS. Which cyclic shifts to be used for which UE group can be fixed in the specification, or configured by higher layer.

Alternatively, in other example embodiments, the initialization of Gold sequence for Rel-15 WUS can be modified to include the UE group ID. For example, the scrambling sequence $c_{n_f,n_s}(i)$, $i=0, 1, \ldots, 2 \cdot 132M-1$ is given by clause 7.2 in 3GPP TS 36.211, and can be initialized at the start of the WUS with equation (1):

$$c_{init\_WUS} = (N_{ID}^{cell} + 1)\left(\left(10n_{f\_start\_PO} + \left\lfloor \frac{n_{s\_start\_PO}}{2} \right\rfloor\right) \bmod 2048 + 1\right)2^9 + \quad (1)$$
$$N_{ID}^{cell} + G_{ID}$$

where $G_{ID}$ is the UE group ID. However, equation (1) with the update of UE group ID is just one example, and other ways to carry the UE_ID information in WUS sequence can also be employed in various embodiments. In another example, the UE group ID $G_{ID}$, the cell ID $N_{ID}^{cell}$ and the variables determining the start of the WUS in the time domain, (e.g., $n_{f\_start\_Po}$ and $n_{s\_start\_PO}$) can be combined in a non-linear manner in the expression for $c_{init\_wus}$ as shown in equation (2):

$$c_{init\_WUS} = (N_{ID}^{cell}+1)\left(\left(10 n_{f\_start\_PO} + \left\lfloor \frac{n_{s\_start\_PO}}{2} \right\rfloor\right) \bmod 2048 + 1\right)2^9 + N_{ID}^{cell} + G_{ID} \quad (2)$$

In some other examples, different multipliers (e.g., which can be a power of 2), can be applied to individual terms of the expression for $c_{init\_wus}$ as illustrated in equation (3):

$$c_{init\_WUS} = (N_{ID}^{cell}+1)(G_{ID}+1) \quad (3)$$
$$\left(\left(10 n_{f\_start\_PO} + \left\lfloor \frac{n_{s\_start\_PO}}{2} \right\rfloor\right) \bmod 2048 + 1\right)2^{12} + N_{ID}^{cell} \cdot 2^3 + G_{ID}$$

Another technique that can be employed in embodiments to generate different WUS sequences for multiple UE groups is to generate a long scrambling sequence $c_{n_f,n_s}(i)$, $i=0, 1, \ldots, 2 \cdot 132 M \cdot N_{grp}^{UE} - 1$ using the same initialization value $c_{init\_wus}$ in clause 7.2 of 36.211. Here $N_{grp}^{UE}$ is the total number of UE groups. Then, a particular WUS sequence can be generated by selecting a proper part of length $(2 \cdot 132M)$ from the long scrambling sequence. Thus, the scrambling sequence for WUS for a UE group with ID v, v=0, 1, ..., $N_{grp}^{UE}-1$, can be determined as in equation (4):

$$c_{n_f,n_s,v}(i') = c_{n_f,n_s}(i' + 2 \cdot 132 M \cdot v), i'=0,1,\ldots,2 \cdot 132M-1. \quad (4)$$

Figure 2:
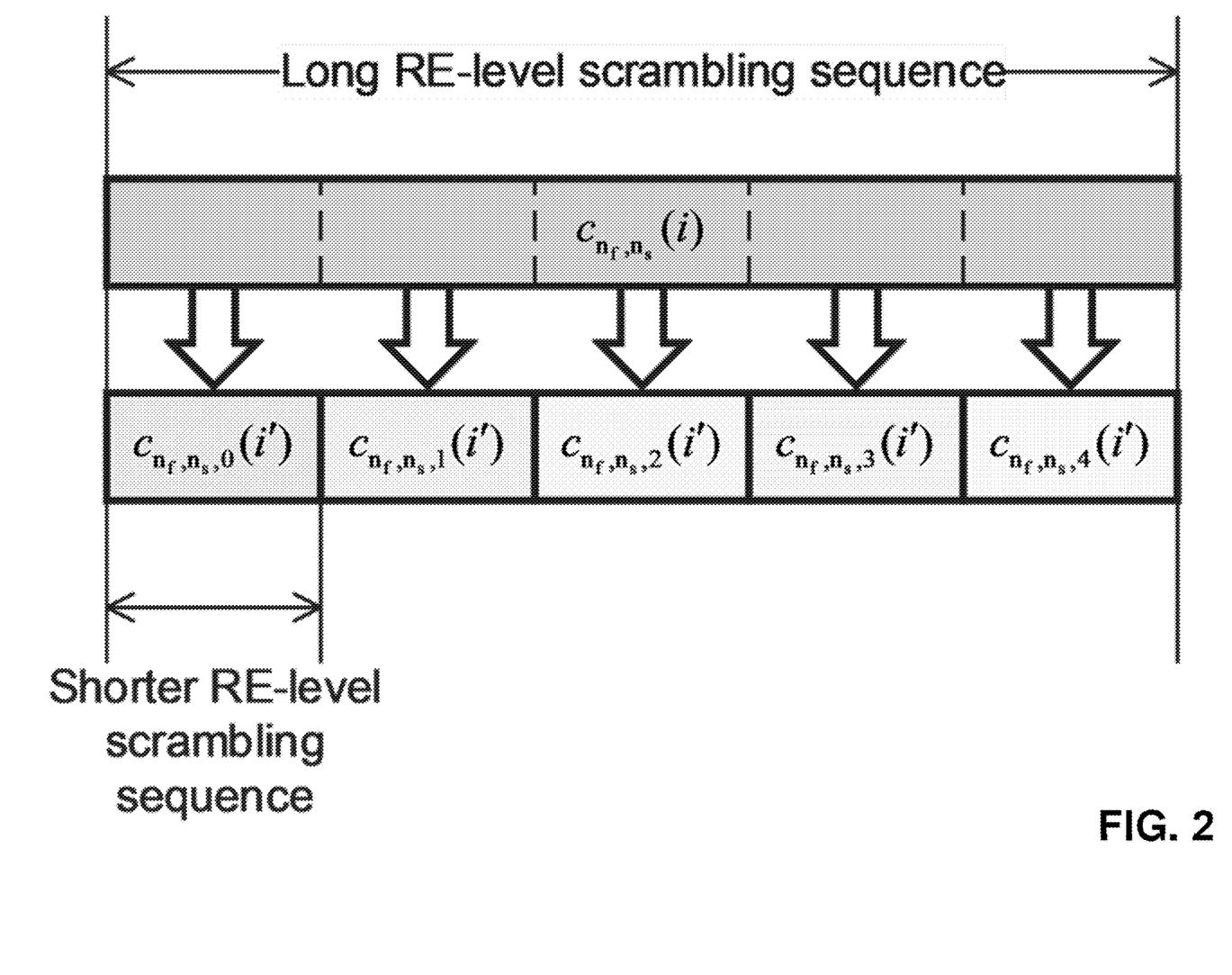
FIG. 2 is a diagram illustrating an example approach to UE-group WUS sequence generation, according to various aspects discussed herein.

In such embodiments, the WUS with group ID v=0 corresponds to the legacy Rel-15 WUS. Referring to FIG. 2, illustrated is a diagram of an example approach to UE-group WUS sequence generation, in aspects discussed herein.

Thus, the UE group WUS sequence can be defined by equations (5):

$$w_v(m) = \theta_{n_f,n_s,v}(m) \cdot e^{-\frac{j\pi un(n+1)}{131}} \quad (5)$$
$$v = 0, 1, \ldots, N_{grp}^{UE} - 1$$
$$m = 0, 1, \ldots, 132M - 1$$
$$n = m \bmod 132$$

$$\theta_{n_f,n_s,v}(m) = \begin{cases} 1, & \text{if } c_{n_f,n_s,v}(2m) = 0 \text{ and } c_{n_f,n_s,v}(2m+1) = 0 \\ -1, & \text{if } c_{n_f,n_s,v}(2m) = 0 \text{ and } c_{n_f,n_s,v}(2m+1) = 1 \\ j, & \text{if } c_{n_f,n_s,v}(2m) = 1 \text{ and } c_{n_f,n_s,v}(2m+1) = 0 \\ -j, & \text{if } c_{n_f,n_s,v}(2m) = 1 \text{ and } c_{n_f,n_s,v}(2m+1) = 1 \end{cases}$$

$$u = (N_{ID}^{cell} \bmod 126) + 3$$

where M is the transmitted number of WUS subframes, $1 \leq M \leq M_{WUSmax}$, where $M_{WUSmax}$ is the maximum number of WUS subframes as defined in 3GPP TS 36.213.

The scrambling sequence $c_{n_f,n_s,v}(i') = c_{n_f,n_s}(i' + 2 \cdot 132 M \cdot v)$, $i'=0, 1, \ldots, 2 \cdot 132M-1$, where the scrambling sequence $c_{n_f,n_s}(i)$, $i=0, 1, \ldots, 2 \cdot 132M \cdot N_{grp}^{UE}-1$, per clause 7.2 of 36.211, and can be initialized at the start of the WUS per equation (6):

$$c_{init\_WUS} = \quad (6)$$
$$(N_{ID}^{cell}+1)\left(\left(10 n_{f\_start\_PO} + \left\lfloor \frac{n_{s\_start\_PO}}{2} \right\rfloor\right) \bmod 2048 + 1\right)2^9 + N_{ID}^{cell}$$

where $n_{f\_start\_PO}$ is the first frame of the first PO to which the MWUS is associated, and $n_{s\_start\_PO}$ is the first slot of the first PO to which the MWUS is associated.

Figure 3:
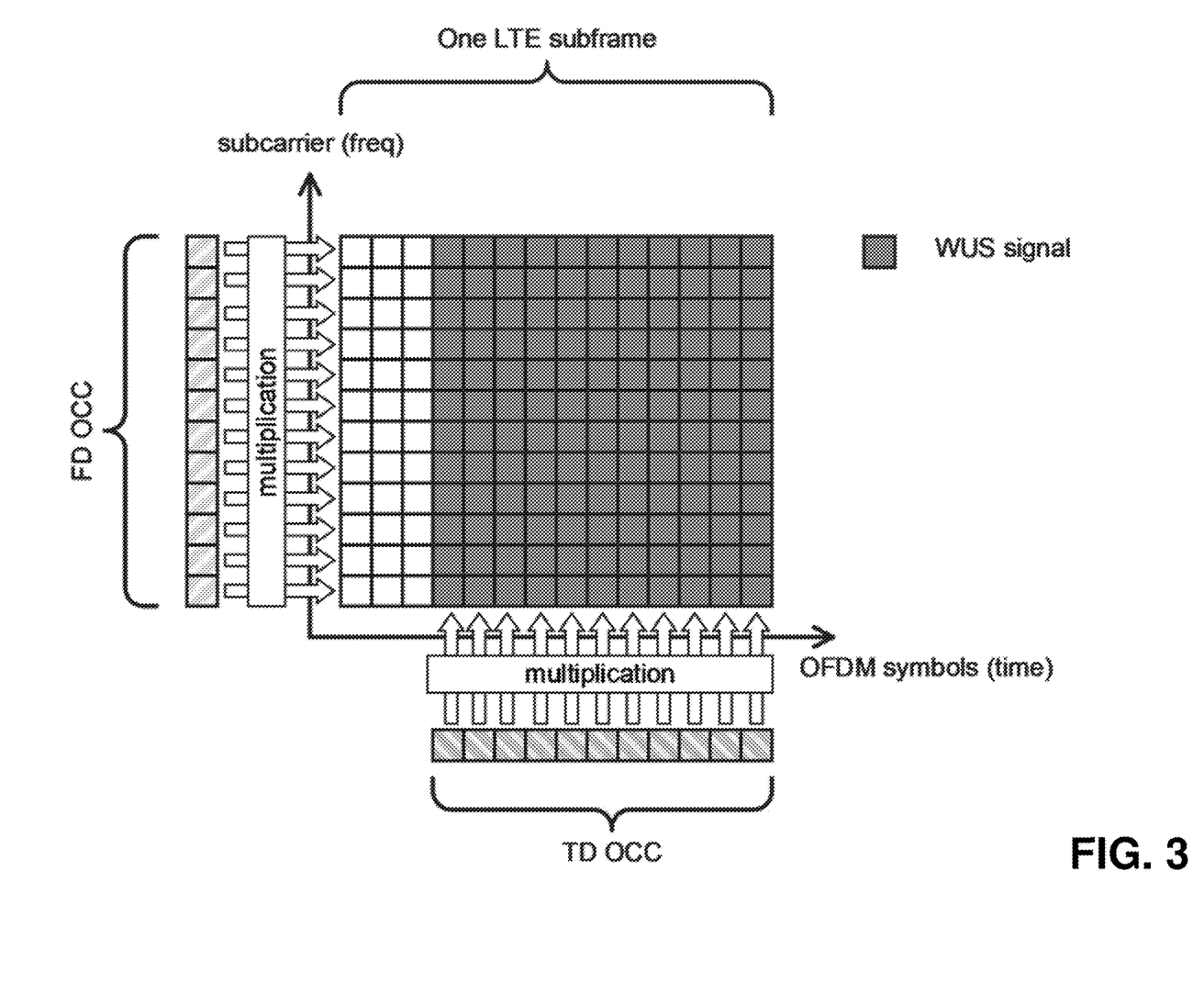
FIG. 3 is a diagram illustrating an example of separate time and frequency domain OCCs (Orthogonal Cover Codes) for a WUS, in various aspects.

Low mutual cross-correlation is one of design targets for UE-group WUS sequences. Generally, sequences with low cross-correlation are better distinguishable from each other at the UE receiver. Therefore, in various embodiments an orthogonal cover codes in the time domain can be used on top of Rel-15 WUS sequence w(m). Referring to FIG. 3, illustrated is an example diagram showing separate time and frequency domain OCCs (Orthogonal Cover Codes) for a WUS, according to various aspects discussed herein. In the example of FIG. 3, for each subframe of WUS signal, the time domain OCC (TD OCC) is applied (e.g., all subcarrier signals from each OFDM symbol can be pre-multiplied by the corresponding symbol from the TD OCC).

Since the WUS signal occupies 11 OFDM symbols of a subframe, the TD OCC has a length equal to 11. In some embodiments, the Barker code of length 11 can be used as TD OCC, where the Barker code is as in equation (7):

$$a(l) = [1\ 1\ 1\ -1\ -1\ -1\ 1\ -1\ 1\ 1\ -1] \quad (7)$$

In such scenarios, different cyclic shifts (CSs) of the base Barker code can be used to produce a set of unique TD OCCs corresponding to different UE groups.

In addition to TD OCCs, in the same or other embodiments, frequency domain OCCs (FD OCCs) can be applied to every subframe containing WUS (e.g., each subcarrier signal of every OFDM symbol can be pre-multiplied by the corresponding symbol from the FD OCC) as also shown in FIG. 3. As an example, some embodiments can employ columns of the matrix G of equation (8) as different FD OCCs corresponding to different UE groups:

$$G = \begin{bmatrix} 1 & 1 & 1 & 1 & 1 & 1 & 1 & 1 & 1 & 1 & 1 & 1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \\ 1 & 1 & -1 & 1 & 1 & 1 & -1 & -1 & -1 & 1 & -1 & -1 \\ 1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & 1 \\ 1 & 1 & -1 & -1 & 1 & -1 & 1 & 1 & 1 & -1 & -1 & -1 \\ 1 & -1 & 1 & -1 & -1 & 1 & -1 & 1 & 1 & 1 & -1 & -1 \\ 1 & -1 & -1 & 1 & -1 & -1 & 1 & -1 & 1 & 1 & 1 & -1 \end{bmatrix} \quad (8)$$

Therefore, the UE group sequence can be defined as in equations (9):

$$w_v(m) = w(m) \cdot a\left(\left(\left\lfloor \frac{m}{12} \right\rfloor + v\right) \bmod 11\right) \cdot g_v(m \bmod 12), \quad (9)$$
$$v = 0, 1, \ldots, N_{grp}^{UE} - 1,$$
$$m = 0, 1, \ldots, 132M - 1,$$

where a(l) is the length-11 Barker code and $g_v$ is the v-th column from matrix G. w(m) is the legacy Rel-15 WUS sequences already defined in the technical specification.

In other embodiments, different time domain resources can be configured for different UE groups associated to the same PO. In Rel-15, time domain resources for WUS are determined by the configurable maximum WUS duration and the configurable gap between the end of the maximum WUS duration to the start of the associated PO. To support multiplexing of WUS for different UE groups in time domain, one or more of the following techniques can be employed.

For eMTC, the starting subframe of WUS transmission for a UE group can be the latest subframe such that there are Lwus BL (Bandwidth reduced Low complexity)/CE (Coverage Enhanced) DL subframes before the start of next WUS to be transmitted for another UE group associated to the same PO, and there are Lgap subframes from the start of the associated PO, where Lwus is the configured maximum WUS duration, and Lgap is the configured gap between the end of maximum WUS duration to the start of associated PO for the UE. If it is the last WUS to be transmitted before the associated PO, the start of the WUS can be the latest subframe such that there are Lwus BL/CE DL subframes followed by Lgap subframes before the start of the associated PO.

For NB-IoT, similar to eMTC, the starting subframe of WUS transmission for a UE group can be the latest subframe such that there is a total of Lwus NB-IoT DL subframes and subframes carrying SIB1-NB before the start of next WUS to be transmitted for another UE group associated to the same PO, and there are Lgap subframes from the start of the associated PO, where Lwus is the configured maximum WUS duration, and Lgap is the configured gap between the end of maximum WUS duration to the start of associated PO for the UE. If it is the last WUS to be transmitted before the associated PO, the start of the WUS is the latest subframe such that there is a total of Lwus NB-IoT DL subframes and subframes carrying SIB1-NB followed by Lgap subframes before the start of the associated PO. In addition, the NB-IoT UE can assume there are at least 10 NB-IoT DL subframes between the end of WUS and first associated PO, as in Rel-15 design.

The multiplexing of WUS in time domain can be combined with above embodiments (e.g., multiplexing in frequency and/or code domain). For example, two set of time resources can be configured for WUS of different UE groups associated to the same PO, and on top of it, 2 cyclic shifts can be used. With this method, WUS for two Rel-16 UE groups can be multiplexed via cyclic shifts in the first set of time domain resources, while common WUS indication and WUS for Rel-15 UEs can be multiplexed in the second set of time domain resources. For backward compatibility, the second set of time domain resources can be configured in the same way as in Rel-15 WUS time resource configuration, and cyclic shift of 0 can be used for the WUS for Rel-15 UEs (i.e., legacy UEs which do not support group WUSs).

Figure 4:
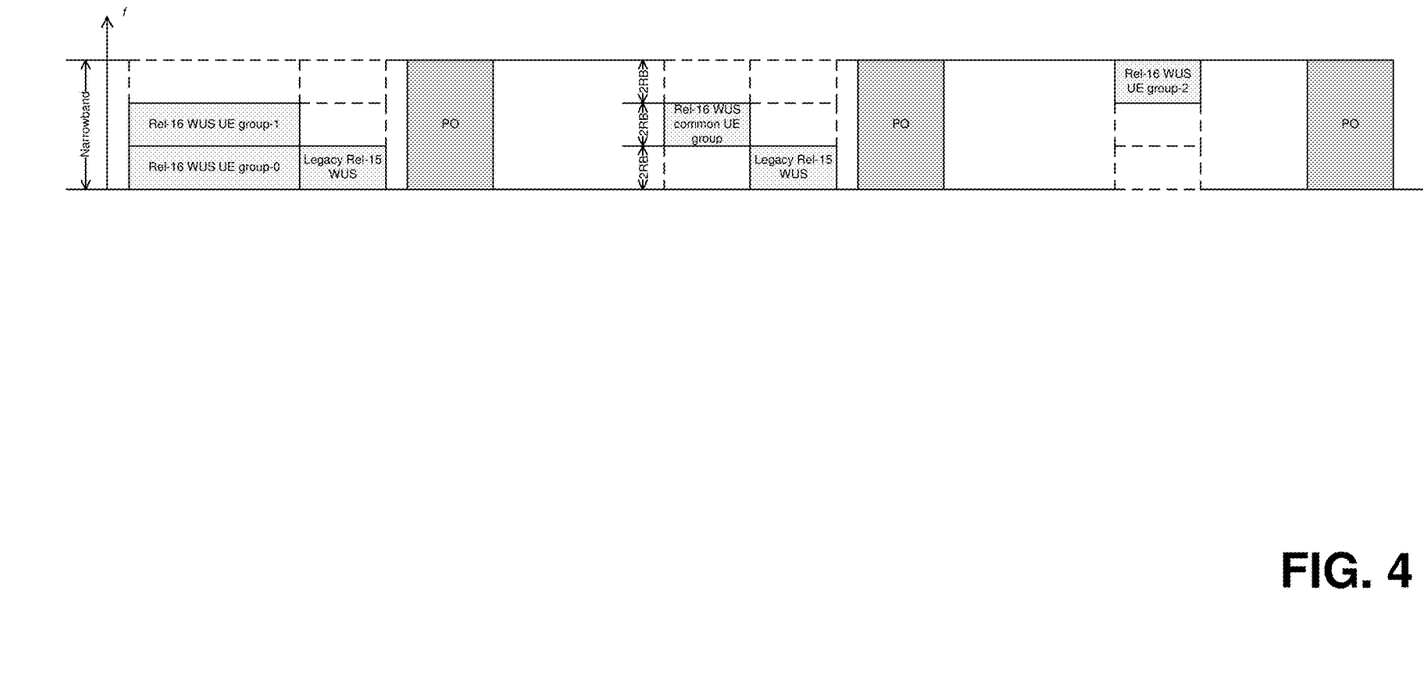
FIG. 4 is a diagram illustrating an example of multiplexing of Rel-15 and Rel-16 WUS for LTE eMTC, according to embodiments discussed herein.

Referring to FIG. 4, illustrated is an example diagram showing multiplexing of Rel-15 and Rel-16 WUS for LTE eMTC, in embodiments. In some embodiments, to maintain WUS detection performance for legacy Rel-15 UEs, legacy Rel-15 WUS can be transmitted in a separated time resource without further multiplexing with other WUS via frequency and/or code division multiplexing (FDM and/or CDM, respectively). All other WUS can be transmitted in a different time resource and can be further multiplexed using FDM and/or CDM. This multiplexing strategy allows applying power boosting to the legacy WUS transmission. In addition, it avoids interference within the serving cell from the new WUS associated with the same PO as the legacy WUS.

Figure 5:
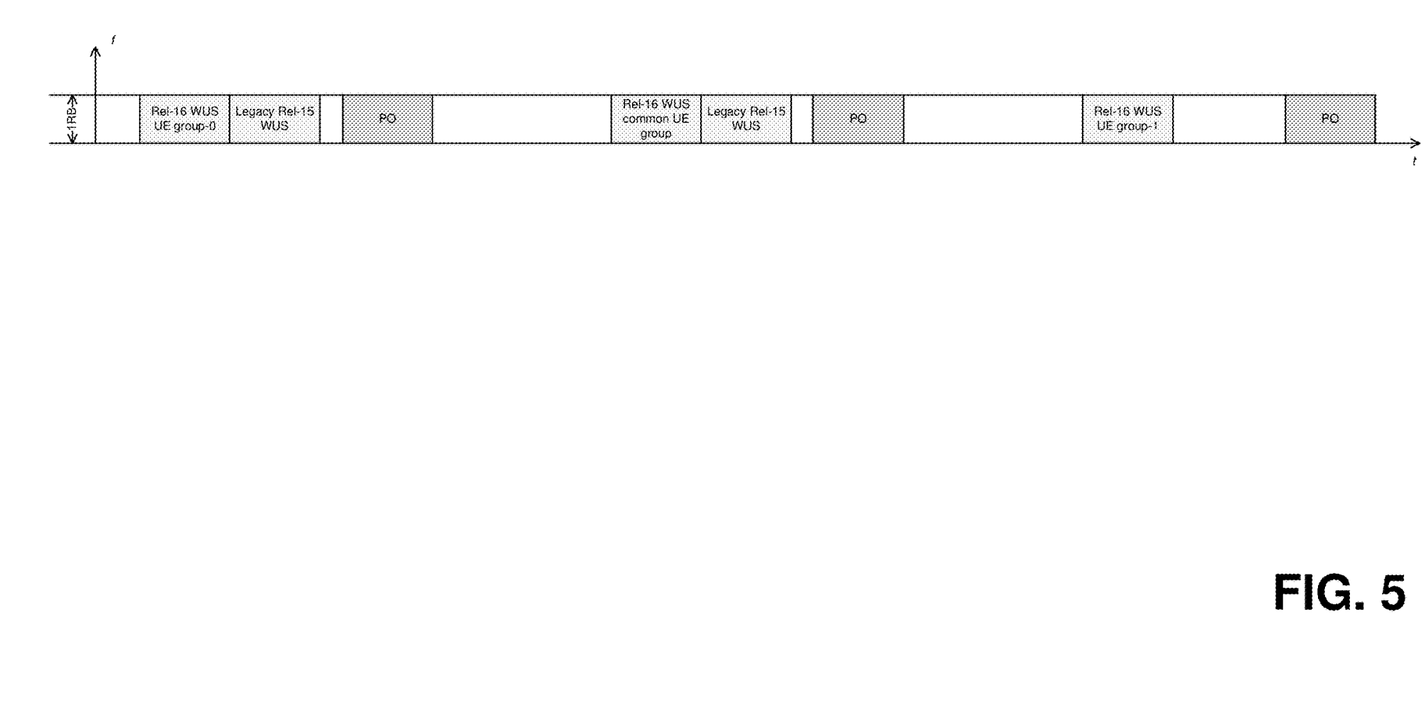
FIG. 5 is a diagram illustrating an example of multiplexing of Rel-15 and Rel-16 WUS for LTE NB-IoT, according to various embodiments discussed herein.

For NB-IoT scenarios, a similar approach can be reused, but taking into account that an NB-IoT carrier bandwidth is equal to one Physical Resource Block (PRB), thereby giving substantially reducing FDM opportunity. Referring to FIG. 5, illustrated is a diagram showing an example of multiplexing of Rel-15 and Rel-16 WUS for LTE NB-IoT, according to various embodiments discussed herein.

With time domain multiplexing, the gap between the WUS and the start of associated PO can be quite large, especially when the configured maximum WUS duration is large, which can impact the UE power saving gain. Thus, in one example, the time domain multiplexing can be supported only when the maximum WUS duration is limited, e.g., no more than a threshold, e.g., 16 or 32 for eMTC and 256 or 512 for NB-IoT. The threshold can be fixed in the specification or can be configurable.

As discussed above, different combinations of above embodiments can be supported. For example, for eMTC, besides the up to 3 possible WUS multiplexed in frequency domain, X different WUS sequences can be introduced for UE sub-grouping, and Y different WUS locations in the time domain can be configured for UE sub-grouping. Thus, up to 3*X*Y UE groups can be supported. Similarly, for NB-IoT, with X different WUS sequences and Y different sets of time domain resources for WUS, up to X*Y UE groups can be supported. In some examples, the number of UE groups that can be supported can be 1 or 2 less than 3*X*Y for eMTC and X*Y for NB-IoT, which can provide the remaining ones for common WUS indication and/or WUS for Rel-15 UEs.

Given the different multiplexing options and possible combinations, the overall configuration of multiple MWUS transmissions for different UE groups is summarized below; various embodiments can be employed to improve configuration flexibility.

Table 1 shows the configuration for MTC Wake-Up Signal (MWUS) as defined in Rel-15 (TS 36.331) and broadcasted in a cell as part of a SI message.

TABLE 1

| Rel-15 MWUS | |
|---|---|
| WUS-Config-r15 ::= | SEQUENCE { |
| maxDurationFactor-r15 | ENUMERATED {one32th, one16th, one8th, one4th}, |
| numPOs-r15 | ENUMERATED {n1, n2, n4, spare1} DEFAULT n1, |
| freqLocation-r15 | ENUMERATED {n0, n2, n4, spare1}, |
| timeOffsetDRX-r15 | ENUMERATED {ms40, ms80, ms160, ms240}, |
| timeOffset-eDRX-Short-r15 | ENUMERATED {ms40, ms80, ms160, ms240}, |
| timeOffset-eDRX-Long-r15 | ENUMERATED {ms1000, ms2000} OPTIONAL -- |

TABLE 1-continued

Rel-15 MWUS

Need OP
}
   WUS-Config field descriptions
   freqLocation
   Frequency location of WUS within paging narrowband for BL UEs and UEs in CE.
   Value n0 corresponds to WUS in the 1st and 2nd PRB, value n2 represents the 3rd and 4th
   PRB, and value n4 represents the 5th and 6th PRB.
   maxDurationFactor
   Parameter "alpha" in TS 36.211 [21]. Maximum WUS duration, expressed as a ratio of
   Rmax associated with Type 1-CSS, see TS 36.211 [21]. Value one 32th corresponds to
   Rmax * 1/32, value one16th corresponds to Rmax * 1/16 and so on.
   The value considered by the UE is : maxDuration = Max (signalled value * Rmax, 1) where
   Rmax is the value of mpdcch-NumRepetitionPaging for the carrier.
   numPOs
   Number of consecutive Paging Occasions (PO) mapped to one WUS, applicable to UEs
   configured to use extended DRX, see TS 36.304 [4]. Value n1 corresponds to 1 PO,
   value n2 corresponds to 2 POs and so on.
   timeOffsetDRX
   Minimum time gap in milliseconds from the end of the configured maximum WUS duration
   to the first associated PO, see TS 36.211 [21]. Value ms40 corresponds to 40 ms,
   value ms80 corresponds to 80 ms and so on.
   timeOffset-eDRX-Short
   When eDRX is used, the short non-zero gap in milliseconds from the end of the configured
   maximum WUS duration to the associated PO, see TS 36.211 [21].
   Value ms40 corresponds to 40 ms, value ms80 corresponds to 80 ms and so on.
   E-UTRAN configures timeOffset-eDRX-Short to a value longer than or equal
   to timeOffsetDRX.
   timeOffset-eDRX-Long
   When eDRX is used, the long non-zero gap in milliseconds from the end of the configured
   maximum WUS duration to the associated PO, see TS 36.211 [21].
   Value ms1000 corresponds to 1000 ms and value ms2000 corresponds to 2000 ms.
   If the field is absent, UE uses timeOffset-eDRX-Short for monitoring WUS.

Accordingly, in an example, SIB signaling can configure additional WUS configurations corresponding to different WUS transmissions associated with one or a set of consecutive POs. In the following, as an example WUS sequence generation is assumed to be by performing scrambling with different parts of a longer Gold sequence $c_{n_f,n_s}(i)$, i=0, 1, ..., $2 \cdot 132M \cdot N_{grp}^{UE}-1$, as described above. However, the following can be applied to any other choice of WUS sequence generation as well.

The configuration for each new WUS group can comprise one or more of:

(A) WUS group ID (v), the range of which can be specified as 0 through 4 (i.e., $N_{grp}^{UE}=5$) for eMTC and 0 through 3 (i.e., $N_{grp}^{UE}=4$) for NB-IoT respectively. Alternatively, the maximum number of groups can be configured via SIB signaling. In aspects, v=0 can be reserved for the Rel-15 WUS. The total number of WUS groups indicated by the network can optionally comprise the common group-WUS, and the exact number of UE-groups for WUS can be determined by the UEs based on information on whether the common group-WUS is configured or not in the cell.

(B) Starting PRB within a narrowband (0, 2, 4) (applicable only for eMTC).

(C) maxDurationFactor, indicating the maximum number of repetitions of the WUS. In an example, this factor is specified as the same as indicated for the Rel-15 WUS configuration. Alternatively, a single value of the maxDurationFactor can be configured as a common value for all non-Rel-15 WUS groups. As yet another alternative, the maxDurationFactor value can be configured for each new WUS group.

(D) timeOffset values from the PO (and thereby, the starting subframe) for the new WUS groups can be indicated in various ways described below in (1), (i), and (ii).

(1) For scenarios wherein at least all the new WUS have the same maxDurationFactor, a new parameter timeLocationIndex can be configured for each new WUS group to indicate the location of the WUS with respect to the PO or with respect to the Rel-15 WUS starting subframe. Thus, a value of timeLocationIndex=0 can indicate the location for this group is the latest WUS occasion before the PO, timeLocationIndex=1 can indicate the location for this group is right before the very last WUS occasion, and so on. In an example, the maximum value of timeLocationIndex can be specified as either 2 or 3 (for eMTC) and as 1 or 2 (for NB-IoT).

(i) If the Rel-15 WUS is assumed as the last WUS transmission before the PO, the relative location for new WUS occasions can be determined based on the timeLocationIndex value and the maxDurationFactor for Rel-15 WUS.

(ii) Generalizing (i), wherein each group is configured separately with maxDurationFactor and timeLocationIndex values, all UEs using the UE-group-WUS feature can calculate the corresponding starting subframe for each WUS group.

Indication of common group-WUS can be implemented by reserving one of the group indices as a common group-WUS, wherein all Rel-16 UEs supporting this feature are expected to monitor for WUS in addition to monitoring for WUS in their respective UE-group (as determined by UE-ID). In an example, the group ID $v=(N_{grp}^{UE}-1)$ can be used to identify the common group-WUS. Alternatively, v=1 can be used. Such a common group-WUS can be optionally configured by the eNB, and when present, it can be configured to overlap with one of the UE-groups in physical time-frequency resources.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: determine a WUS group of a plurality of WUS groups, wherein the WUS group is associated with a first group WUS (Wake Up Signal) of a plurality of group WUSs; determine a starting subframe for the first group WUS; and monitor the starting subframe for the first group WUS, wherein the UE is configured to communicate via one or more of eMTC (enhanced Machine Type Communication) or NB (NarrowBand)-IoT (Internet of Things).

Example 2 comprises the subject matter of any variation of any of example(s) 1, wherein the processing circuitry is further configured to process higher layer signaling that configures one or more parameters of the WUS group.

Example 3 comprises the subject matter of any variation of any of example(s) 1, wherein the processing circuitry is configured to determine the WUS group based on a UE ID (Identifier) of the UE.

Example 4 comprises the subject matter of any variation of any of example(s) 3, wherein the UE ID is an IMSI (International Mobile Subscriber Identity) of the UE.

Example 5 comprises the subject matter of any variation of any of example(s) 1, wherein physical resources for the first group WUS are multiplexed in a frequency domain with one or more other group WUSs of the plurality of group WUSs.

Example 6 comprises the subject matter of any variation of any of example(s) 5, wherein the UE is a BL (Bandwidth reduced Low complexity)/CE (Coverage Enhanced) DL UE, and wherein the physical resources for the first group WUS are within a first narrowband of a plurality of configured narrowbands.

Example 7 comprises the subject matter of any variation of any of example(s) 5, wherein the UE is a NB (NarrowBand)-IoT (Internet of Things) UE, and wherein the physical resources for the first group WUS are within a first carrier of a plurality of configured carriers.

Example 8 comprises the subject matter of any variation of any of example(s) 1, wherein physical resources for the first group WUS are multiplexed in a time domain with one or more other group WUSs of the plurality of group WUSs.

Example 9 comprises the subject matter of any variation of any of example(s) 8, wherein the physical resources for the first group WUS are multiplexed in the time domain with a WUS for one or more other UEs that do not support group WUSs.

Example 10 comprises the subject matter of any variation of any of example(s) 1, wherein physical resources for the first group WUS are shared with one or more other group WUSs of the plurality of group WUSs, and wherein the first group WUS and the one or more other group WUSs are multiplexed using quasi-orthogonal codes.

Example 11 comprises the subject matter of any variation of any of example(s) 1, wherein physical resources for the first group WUS are multiplexed with one or more other group WUSs of the plurality of group WUSs in at least two of a frequency domain, a time domain, or a code domain.

Example 12 comprises the subject matter of any variation of any of example(s) 1, wherein a sequence of the first group WUS is generated based on a RE-level Gold sequence generated based on Na that is longer than the sequence of the first group WUS, wherein $N_{grp}^{UE}$ is the number of WUS groups in the plurality of WUS groups.

Example 13 comprises the subject matter of any variation of any of example(s) 12, wherein the sequence of the first group WUS is a subsequence of the RE-level Gold sequence generated based on $N_{grp}^{UE}$, wherein the subsequence is shorter than the RE-level Gold sequence generated based on $N_{grp}^{UE}$.

Example 14 comprises the subject matter of any variation of any of example(s) 1, wherein a sequence of the first group WUS is generated based on a sequence a WUS for one or more other UEs that do not support group WUSs and on a first time domain OCC (Orthogonal Cover Code) of length 11 applied to all subframes carrying the first group WUS.

Example 15 comprises the subject matter of any variation of any of example(s) 14, wherein the sequence of the first group WUS is generated based on a first frequency domain OCC of length 12 applied to each OFDM (Orthogonal Frequency Division Multiplexing) symbol of all the subframes carrying the first group WUS.

Example 16 comprises the subject matter of any variation of any of example(s) 15, wherein the first time domain OCC is one of $N_{grp}^{UE}$ different time domain OCCs, wherein the first frequency domain OCC is one of $N_{grp}^{UE}$ different frequency domain OCCs, and wherein $N_{grp}^{UE}$ is the number of WUS groups in the plurality of WUS groups.

Example 17 is an apparatus configured to be employed in a gNB (next generation Node B), comprising: a memory interface; and processing circuitry configured to: determine a WUS group of a plurality of WUS groups, wherein the WUS group is associated with a first group WUS (Wake Up Signal) of a plurality of group WUSs; determine a starting subframe for the first group WUS; generate a sequence for the first group WUS; and map the sequence for the first group WUS to one or more consecutive subframes beginning in the starting subframe for the first group WUS, wherein the first group WUS is associated with one or more of eMTC (enhanced Machine Type Communication) or NB (NarrowBand)-IoT (Internet of Things).

Example 18 comprises the subject matter of any variation of any of example(s) 17, wherein the processing circuitry is configured to generate the sequence for the first group WUS based on a RE-level Gold sequence generated based on $N_{grp}^{UE}$ that is longer than the sequence of the first group WUS, wherein $N_{grp}^{UE}$ is the number of WUS groups in the plurality of WUS groups.

Example 19 is a machine readable medium comprising instructions that, when executed, cause a User Equipment (UE) to: determine a WUS group of a plurality of WUS groups, wherein the WUS group is associated with a first group WUS (Wake Up Signal) of a plurality of group WUSs; determine a starting subframe for the first group WUS; and monitor the starting subframe for the first group WUS, wherein the UE is configured to communicate via one or more of eMTC (enhanced Machine Type Communication) or NB (NarrowBand)-IoT (Internet of Things).

Example 20 comprises the subject matter of any variation of any of example(s) 19, wherein the instructions, when executed, further cause the UE to process higher layer signaling that configures one or more parameters of the WUS group.

Example 21 comprises an apparatus comprising means for executing any of the described operations of examples 1-20.

Example 22 comprises a machine readable medium that stores instructions for execution by a processor to perform any of the described operations of examples 1-20.

Example 23 comprises an apparatus comprising: a memory interface; and processing circuitry configured to: perform any of the described operations of examples 1-20.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature can be combined with one or more other features of the other implementations as may be desired and advantageous for any given or particular application.

What is claimed is:

1. An apparatus configured to be employed in a UE (User Equipment) comprising
processing circuitry configured to:
determine a starting subframe for a first time domain resource for monitoring a first group WUS (Wake Up Signal) of a plurality of group WUSs as a latest subframe such that there is a total of Lwus NB-IoT downlink subframes and subframes carrying system information block 1 (SIB1)-NB before a start of a second time domain resource for another group WUS for a same paging occasion (PO), wherein there are Lgap subframes from an end of the second time domain resource to the start of the PO, and wherein Lwus is a configured maximum WUS duration; and
monitor the starting subframe on the first time domain resource for the first group WUS.

2. The apparatus of claim 1, wherein the processing circuitry is further configured to process higher layer signaling that configures one or more parameters of the first group WUS.

3. The apparatus of claim 1, wherein the processing circuitry is configured to determine a WUS group based on a UE ID (Identifier) of the UE.

4. The apparatus of claim 3, wherein the UE ID is based on a modulo function of an IMSI (International Mobile Subscriber Identity) of the UE.

5. The apparatus of claim 1, wherein physical resources for the first group WUS are multiplexed in a frequency domain with one or more other group WUSs of the plurality of group WUSs.

6. The apparatus of claim 5, wherein the UE is a BL (Bandwidth reduced Low complexity)/CE (Coverage Enhanced) DL UE, and wherein the physical resources for the first group WUS are within a first narrowband of a plurality of configured narrowbands.

7. The apparatus of claim 5, wherein the UE is a NB (Narrowband)-IoT (Internet of Things) UE, and wherein the physical resources for the first group WUS are within a first carrier of a plurality of configured carriers.

8. The apparatus of claim 1, wherein physical resources for the first group WUS are multiplexed in a time domain with one or more other group WUSs of the plurality of group WUSs.

9. The apparatus of claim 8, wherein the physical resources for the first group WUS are multiplexed in the time domain with a WUS for one or more other UEs that do not support group WUSs.

10. The apparatus of claim 1, wherein physical resources for the first group WUS are shared with one or more other group WUSs of the plurality of group WUSs, and wherein the first group WUS and the one or more other group WUSs are multiplexed using quasi-orthogonal codes.

11. The apparatus of claim 1, wherein physical resources for the first group WUS are multiplexed with one or more other group WUSs of the plurality of group WUSs in at least two of a frequency domain, a time domain, or a code domain.

12. The apparatus of claim 1, wherein Lgap is a configured minimum gap between an end of a maximum WUS signal duration and a start of the PO.

13. An apparatus configured to be employed in a base station, comprising
processing circuitry configured to:
determine a starting subframe for a first time domain resource for monitoring a first group WUS as a latest subframe such that there is a total of Lwus NB-IoT downlink subframes and subframes carrying system information block 1 (SIB1)-NB before a start of a second time domain resource for another group WUS for a same paging occasion (PO), wherein there are Lgap subframes from an end of the second time domain resource to the start of the PO, and wherein Lwus is a configured maximum WUS duration;
generate a sequence for the first group WUS; and
map the sequence for the first group WUS to one or more subframes beginning in the starting subframe on the first time domain resource for the first group WUS.

14. The apparatus of claim 13, wherein Lgap is a configured minimum gap between an end of a maximum WUS signal duration and a start of the PO.

15. A machine readable medium comprising instructions that, when executed, cause a User Equipment (UE) to:
determine a starting subframe for a first time domain resource for monitoring a first group WUS as a latest subframe such that there is a total of Lwus NB-IoT downlink subframes and subframes carrying system information block 1 (SIB1)-NB before a start of a second time domain resource for another group WUS for a same paging occasion (PO), wherein there are Lgap subframes from an end of the second time domain resource to the start of the PO, and wherein Lwus is a configured maximum WUS duration; and
monitor the starting subframe on the first time domain resource for the first group WUS.

16. The machine readable medium of claim 15, wherein the instructions, when executed, further cause the UE to process higher layer signaling that configures one or more parameters of the first WUS group.

17. The machine readable medium of claim 15, wherein Lgap is a configured minimum gap between an end of a maximum WUS signal duration and a start of the PO.

18. The machine readable medium of claim 15, wherein the instructions, when executed, further cause the UE to process higher layer signaling that configures one or more parameters of the first group WUS.

19. The machine readable medium of claim 15, wherein the instructions, when executed, further cause the UE to determine a WUS group based on a UE ID (Identifier) of the UE.

20. The a machine readable medium of claim 19, wherein the UE ID is based on a modulo function of an IMSI (International Mobile Subscriber Identity) of the UE.

* * * * *